United States Patent
Chang

(10) Patent No.: US 10,909,615 B2
(45) Date of Patent: *Feb. 2, 2021

(54) SYSTEM, MANUFACTURE, AND METHOD OF SITE OUTAGE MANAGEMENT

(71) Applicant: PayPal, Inc., San Jose, CA (US)

(72) Inventor: Suzy K. Chang, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 586 days.

This patent is subject to a terminal disclaimer.

(21) Appl. No.: 15/800,016

(22) Filed: Oct. 31, 2017

(65) Prior Publication Data
US 2018/0121998 A1 May 3, 2018

Related U.S. Application Data

(63) Continuation of application No. 14/708,440, filed on May 11, 2015, now Pat. No. 9,805,413.

(51) Int. Cl.
*G06Q 30/00* (2012.01)
*G06Q 30/08* (2012.01)
*G06Q 30/02* (2012.01)
*H04L 12/26* (2006.01)
*G06Q 30/06* (2012.01)

(52) U.S. Cl.
CPC ......... *G06Q 30/08* (2013.01); *G06Q 30/0215* (2013.01); *G06Q 30/06* (2013.01); *G06Q 30/0601* (2013.01); *G06Q 30/0613* (2013.01); *G06Q 30/0641* (2013.01); *H04L 43/065* (2013.01); *H04L 43/067* (2013.01); *G06Q 30/0631* (2013.01)

(58) Field of Classification Search
CPC ................ G06Q 30/0601–0645; G06Q 30/08
USPC ................................. 705/26.1–27.2
See application file for complete search history.

(56) References Cited

U.S. PATENT DOCUMENTS

| 7,539,746 B2 | 5/2009 | Bankier |
| 8,190,693 B2 | 5/2012 | Bank |
| 8,626,651 B2 | 1/2014 | Lin |

(Continued)

OTHER PUBLICATIONS

Silver, Elliot, Change to GoDaddy Auctions Time Extension, Jul. 11, 2014, DomainInvesting.com, accessed at [https://domaininvesting.com/change-godaddy-auctions-time-extension/] (Year: 2014).*

(Continued)

*Primary Examiner* — Jeffrey A. Smith
*Assistant Examiner* — Lindsey B Smith

(57) ABSTRACT

Systems and methods of site outage management are disclosed. In some example embodiments, a service outage of an online service is detected. The service outage disables the online service from receiving a bid for an item listing on the online service. The item listing has a seller and a listing end time. Timing information for the service outage is determined, and the item listing is identified based on the listing end time and the timing information for the service outage. An outage management action is performed based on the item listing being identified. The outage management action comprises one of automatically extending the listing end time, automatically transmitting an outage notification of the service outage to the seller, and automatically issuing a credit to an account of the seller.

20 Claims, 15 Drawing Sheets

(56) References Cited

U.S. PATENT DOCUMENTS

| | | |
|---|---|---|
| 9,805,413 B2 | 10/2017 | Chang |
| 2001/0037285 A1 | 11/2001 | Alaia |
| 2010/0293053 A1 | 11/2010 | Potineni |
| 2011/0276452 A1* | 11/2011 | Stephens ............ G06Q 30/08 705/35 |
| 2014/0358626 A1 | 12/2014 | Bardhan |
| 2016/0335652 A1 | 11/2016 | Chang |

OTHER PUBLICATIONS

EBay Help, Outage Policy. (May 9, 2008). Retrieved Aug. 10, 2016, from http://web.archive.org/web/20080509165746/http://pages.ebay.com/help/poli- cies/everyone-outage.html.

Entire Prosecution History of U.S. Appl. No. 14/708,440, titled System and Method of Site Outage Management, filed May 11, 2015.

* cited by examiner

SYSTEM, MANUFACTURE, AND METHOD OF SITE OUTAGE MANAGEMENT

CROSS-REFERENCE TO RELATED APPLICATIONS

This application is a continuation of U.S. patent application Ser. No. 14/708,440, filed on May 11, 2015, now U.S. Pat. No. 9,805,413, issued Oct. 31, 2017; the disclosure of this application and patent is incorporated by reference herein.

TECHNICAL FIELD

Embodiments of the present disclosure relate generally to data processing and, more particularly, but not by way of limitation, to systems and methods of site outage management.

BACKGROUND

Auctions conducted across the Internet have become a very popular method of selling goods and services, which can both be referred to as items. In a typical ascending price auction, once a seller has submitted a request to sell an item, the item becomes available for bidding via an item listing, with the bidding to close typically at some predetermined time (e.g., at noon, 3 days later). Potential buyers are able to view a description and possibly an image of the item, and submit one or more bids for the item via the item listing. The potential buyer that submitted the highest bid on the item at the end of the auction wins the auction and is typically contractually obligated to purchase the item for the bid amount. The highest bid buyer is notified and the transaction between the seller and the highest bid buyer is facilitated.

Online services, such as Internet-based auctions, can suffer from outages, rendering the services unavailable to their users for a period of time. In the context of an online auction, such services that may become unavailable to users include enabling users to submit a bid for an item listing. As a result, outages prevent users from using such services and prevent service providers from providing such services to their users, as well as causing other technical problems. For online auctions, when an outage occurs too close to the end time of an item listing, potential bidders can be prevented from submitting a bid for the item listing, especially when the end time is during the outage, as many potential bidders wait until the last few moments (e.g., one minute before the end time) to submit a bid. As a result, the seller of the affected item listing does not benefit from the full duration of the listing time and often loses a higher sale price due to the outage. Although sellers can contact a customer service agent to receive a credit for the lost revenue, this remedial measure does not help prevent the problem or resolve the loss of function of the online service. Furthermore, it is an imprecise and unreliable manual process. If the seller does not contact a customer service agent, then he or she is not compensated for the impact of the outage on the item listing, which can result in a bad user experience and an unjust collecting of certain service fees from the seller. Currently, there are no effective technological solutions to this technological problem of outages.

BRIEF DESCRIPTION OF THE DRAWINGS

Some embodiments of the present disclosure are illustrated by way of example and not limitation in the figures of the accompanying drawings, in which like reference numbers indicate similar elements.

Figure 1:
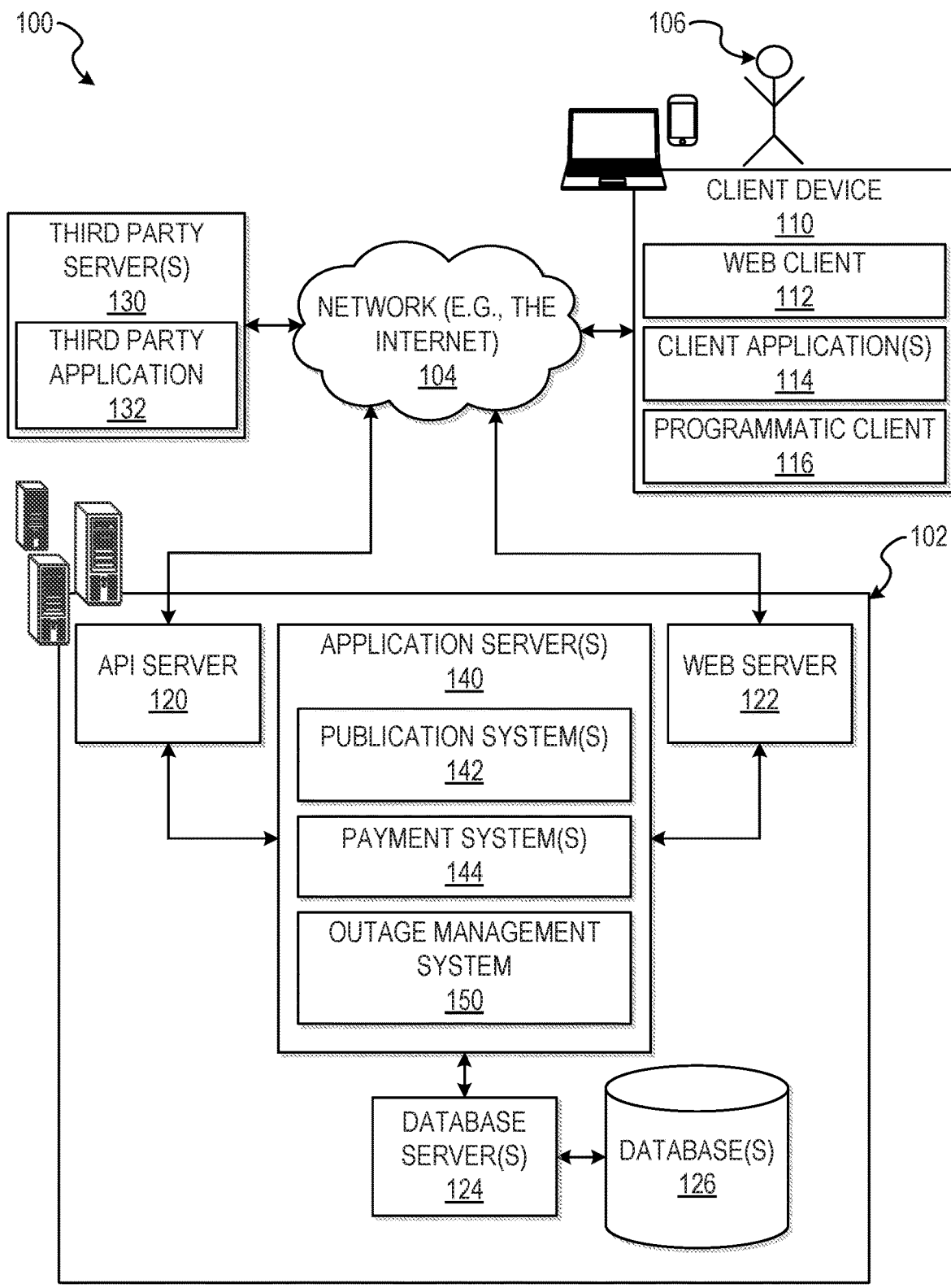
FIG. 1 is a block diagram illustrating a networked system, in accordance with some example embodiments.

The headings provided herein are merely for convenience and do not necessarily affect the scope or meaning of the terms used.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for handling outages by automatically detecting item listings that are impacted by service outages (e.g., a website outage) and performing one or more outage management actions based on the detection.

Systems and methods of site outage management are disclosed herein. In some example embodiments, an indication of a service outage of an online service is detected or received, with the service outage disabling the online service from receiving a bid for an item listing on the online service, and the item listing having a seller and a listing end time. Timing information for the service outage is determined, and the item listing is identified or otherwise determined based on the listing end time and the timing information for the service outage. An outage management action is performed based on the identification or determination of the item listing. The outage management action comprises one of automatically extending the listing end time, automatically transmitting an outage notification of the service outage to the seller, and automatically issuing a credit to an account of the seller.

In some example embodiments, the timing information for the service outage comprises an outage end time, and identifying the item listing based on the listing end time and the timing information for the service outage comprises identifying the item listing based on the outage end time satisfying a predetermined proximity threshold with respect to the listing end time.

In some example embodiments, the outage management action comprises automatically extending the end time of the item listing. In some example embodiments, the end time is extended based on the timing information for the service outage, and the timing information comprises an amount of time the online service was disabled. In some example embodiments, the outage management action further comprises identifying at least one potential bidder for the item listing, and transmitting an extension notification to the at least one potential bidder, the extension notification indicating that the end time of the item listing has been extended.

In some example embodiments, the outage management action comprises automatically transmitting the outage notification of the service outage to the seller. In some example embodiments, the outage notification indicates an option for the seller to request a credit.

In some example embodiments, the outage management action comprises automatically issuing the credit to the account of the seller. In some example embodiments, an amount of the credit is determined based on at least one of a final value fee of the item listing, an insertion fee of the item listing, and an estimated final bid value if the service outage had not occurred.

The methods or embodiments disclosed herein can be implemented as a computer system having one or more modules (e.g., hardware modules or software modules). Such modules can be executed by one or more processors of the computer system. The methods or embodiments disclosed herein can be embodied as instructions stored on a machine-readable medium that, when executed by one or more processors, cause the one or more processors to perform the instructions.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142, payment systems 144, and outage management systems 150, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The outage management system 150 may provide functionality operable to perform various outage management operations, as will be discussed in further detail below. The outage management system 150 may access the data from the databases 126, the third party servers 130, the publication system 142, and other sources. In some example embodiments, the outage management system 150 may analyze the data to perform outage management operations. In some example embodiments, the outage management system 150 may communicate with the publication systems 142 (e.g., accessing item listings) and payment system 144. In an alternative embodiment, the outage management system 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and outage management system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
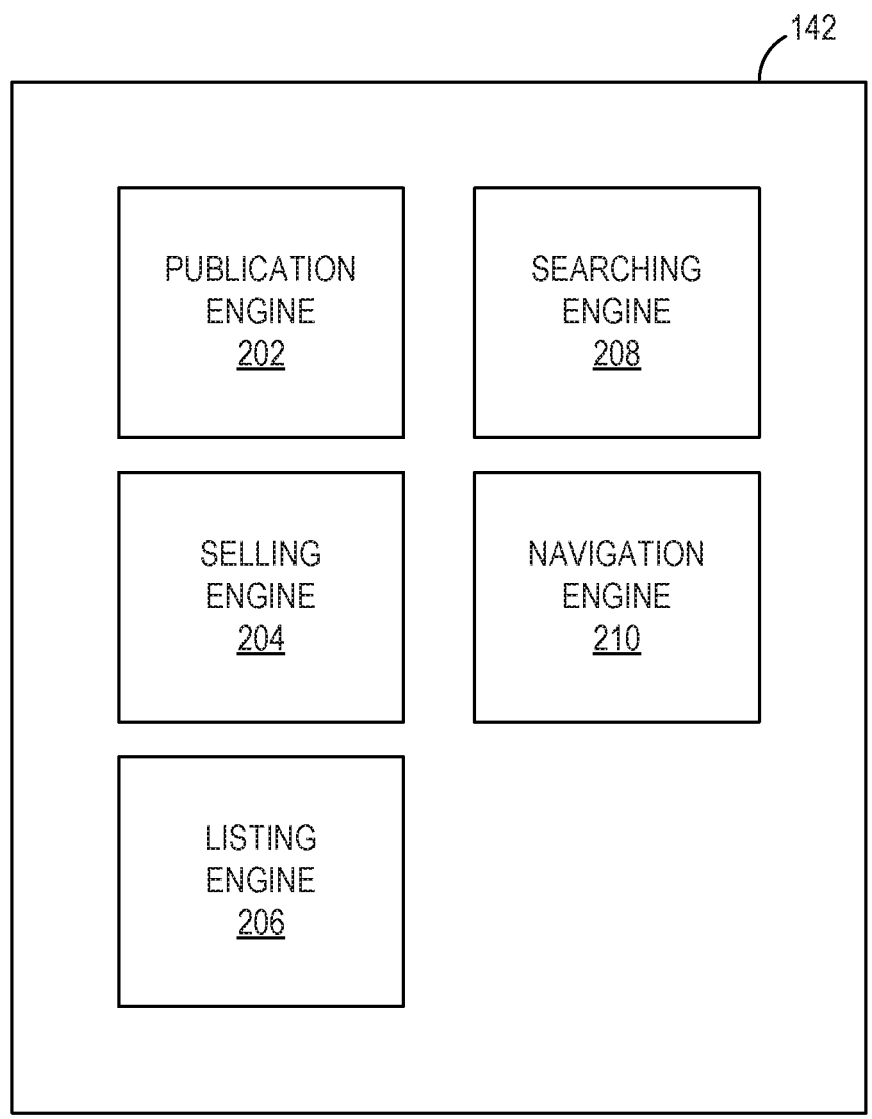
FIG. 2 is a block diagram illustrating various components of a network-based publication system, in accordance with some example embodiments.

FIG. 2 is a block diagram illustrating various components of the network-based publication system 142, in accordance with some example embodiments. The publication system 142 can be hosted on dedicated or shared server machines that are communicatively coupled to enable communications between server machines. The components themselves are communicatively coupled (e.g., via appropriate interfaces) to each other and to various data sources, so as to allow information to be passed between the components or so as to allow the components to share and access common data. Furthermore, the components can access one or more databases 126 via the database servers 124.

The publication system 142 can provide a number of publishing, listing, and/or price-setting mechanisms whereby a seller (also referred to as a first user) can list (or publish information concerning) goods or services for sale or barter, a buyer (also referred to as a second user) can express interest in or indicate a desire to purchase or barter such goods or services, and a transaction (such as a trade) can be completed pertaining to the goods or services. To this end, the publication system 142 can comprise at least one publication engine 202 and one or more selling engines 204. The publication engine 202 can publish information, such as item listings or product description pages, on the publication system 142. In some embodiments, the selling engines 204 can comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines can also provide a number of features in support of these auction-format listings, such as a reserve price feature whereby a seller can specify a reserve price in connection with a listing and a proxy-bidding feature whereby a bidder can invoke automated proxy bidding. The selling engines 204 can further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the publication system 142. In some embodiments, the listings can be an offer, deal, coupon, or discount for the good or service. Each good or service is associated with a particular category. The listing engine 206 can receive listing data such as title, description, and aspect name/value pairs. Furthermore, each listing for a good or service can be assigned an item identifier. In other embodiments, a user can create a listing that is an advertisement or other form of information publication. The listing information can then be stored to one or more storage devices coupled to the publication system 142 (e.g., databases 126). Listings also can comprise product description pages that display a product and information (e.g., product title, specifications, and reviews) associated with the product. In some embodiments, the product description page can include an aggregation of item listings that correspond to the product described on the product description page.

The listing engine 206 can also allow buyers to conveniently author listings or requests for items desired to be purchased. In some embodiments, the listings can pertain to goods or services that a user (e.g., a buyer) wishes to transact via the publication system 142. Each good or service is associated with a particular category. The listing engine 206 can receive as much or as little listing data, such as title, description, and aspect name/value pairs, that the buyer is aware of about the requested item. In some embodiments, the listing engine 206 can parse the buyer's submitted item information and can complete incomplete portions of the listing. For example, if the buyer provides a brief description of a requested item, the listing engine 206 can parse the description, extract key terms, and use those terms to make a determination of the identity of the item. Using the determined item identity, the listing engine 206 can retrieve additional item details for inclusion in the buyer item request. In some embodiments, the listing engine 206 can assign an item identifier to each listing for a good or service.

In some embodiments, the listing engine 206 allows sellers to generate offers for discounts on products or services. The listing engine 206 can receive listing data, such as the product or service being offered, a price and/or discount for the product or service, a time period for which the offer is valid, and so forth. In some embodiments, the listing engine 206 permits sellers to generate offers from the sellers' mobile devices. The generated offers can be uploaded to the publication system 142 for storage and tracking.

Searching the publication system 142 is facilitated by a searching engine 208. For example, the searching engine 208 enables keyword queries of listings published via the publication system 142. In example embodiments, the searching engine 208 receives the keyword queries from a device of a user and conducts a review of the storage device storing the listing information. The review will enable compilation of a result set of listings that can be sorted and returned to the client device 110 of the user. The searching engine 208 can record the query (e.g., keywords) and any subsequent user actions and behaviors (e.g., navigations).

The searching engine 208 also can perform a search based on the location of the user. A user can access the searching engine 208 via a mobile device and generate a search query. Using the search query and the user's location, the searching engine 208 can return relevant search results for products, services, offers, auctions, and so forth to the user. The searching engine 208 can identify relevant search results both in a list form and graphically on a map. Selection of a graphical indicator on the map can provide additional details regarding the selected search result. In some embodiments, the user can specify as part of the search query a radius or distance from the user's current location to limit search results.

The searching engine 208 also can perform a search based on an image. The image can be taken from a camera or imaging component of a client device or can be accessed from storage.

In a further example, a navigation engine 210 allows users to navigate through various categories, catalogs, or inventory data structures according to which listings can be classified within the publication system 142. For example, the navigation engine 210 allows a user to successively navigate down a category tree comprising a hierarchy of categories (e.g., the category tree structure) until a particular set of listings is reached. Various other navigation applications within the navigation engine 210 can be provided to supplement the searching and browsing applications. The navigation engine 210 can record the various user actions (e.g., clicks) performed by the user in order to navigate down the category tree.

Figure 3:
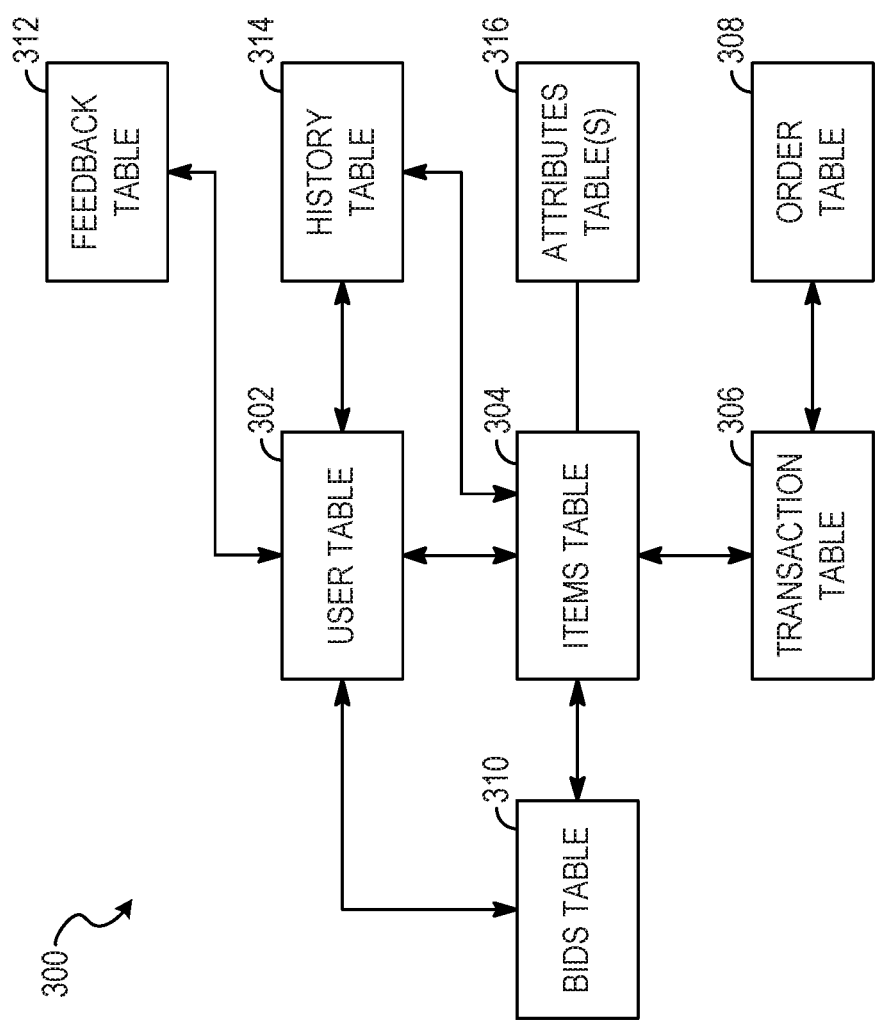
FIG. 3 is a block diagram illustrating various tables that can be maintained within a database, in accordance with some example embodiments.

FIG. 3 is a high-level entity-relationship diagram, illustrating various tables 300 that can be maintained within the database(s) 126, and that are utilized by and support the systems 142, 144, and 150. A user table 302 contains a record for each registered user of the networked system 102, and can include identifier, address and financial instrument information pertaining to each such registered user. A user can operate as a seller, a buyer, or both, within the networked system 102. In one example embodiment, a buyer can be a user that has accumulated value (e.g., commercial or proprietary currency), and is accordingly able to exchange the accumulated value for items that are offered for sale by the networked system 102.

The tables 300 also include an items table 304 in which are maintained item records for goods and services that are available to be, or have been, transacted via the networked system 102. Each item record within the items table 304 can furthermore be linked to one or more user records within the user table 302, so as to associate a seller and one or more actual or potential buyers with each item record.

A transaction table 306 contains a record for each transaction (e.g., a purchase or sale transaction) pertaining to items for which records exist within the items table 304.

An order table 308 is populated with order records, with each order record being associated with an order. Each order, in turn, can be associated with one or more transactions for which records exist within the transaction table 306.

Bid records within a bids table 310 each relate to a bid received at the networked system 102 in connection with an auction-format listing supported by an auction application. A feedback table 312 is utilized by one or more reputation applications, in one example embodiment, to construct and maintain reputation information concerning users. A history table 314 maintains a history of transactions to which a user has been a party. One or more attributes tables 316 record attribute information pertaining to items for which records exist within the items table 304. Considering only a single example of such an attribute, the attributes tables 316 can indicate a currency attribute associated with a particular item, with the currency attribute identifying the currency of a price for the relevant item as specified by a seller.

Figure 4:
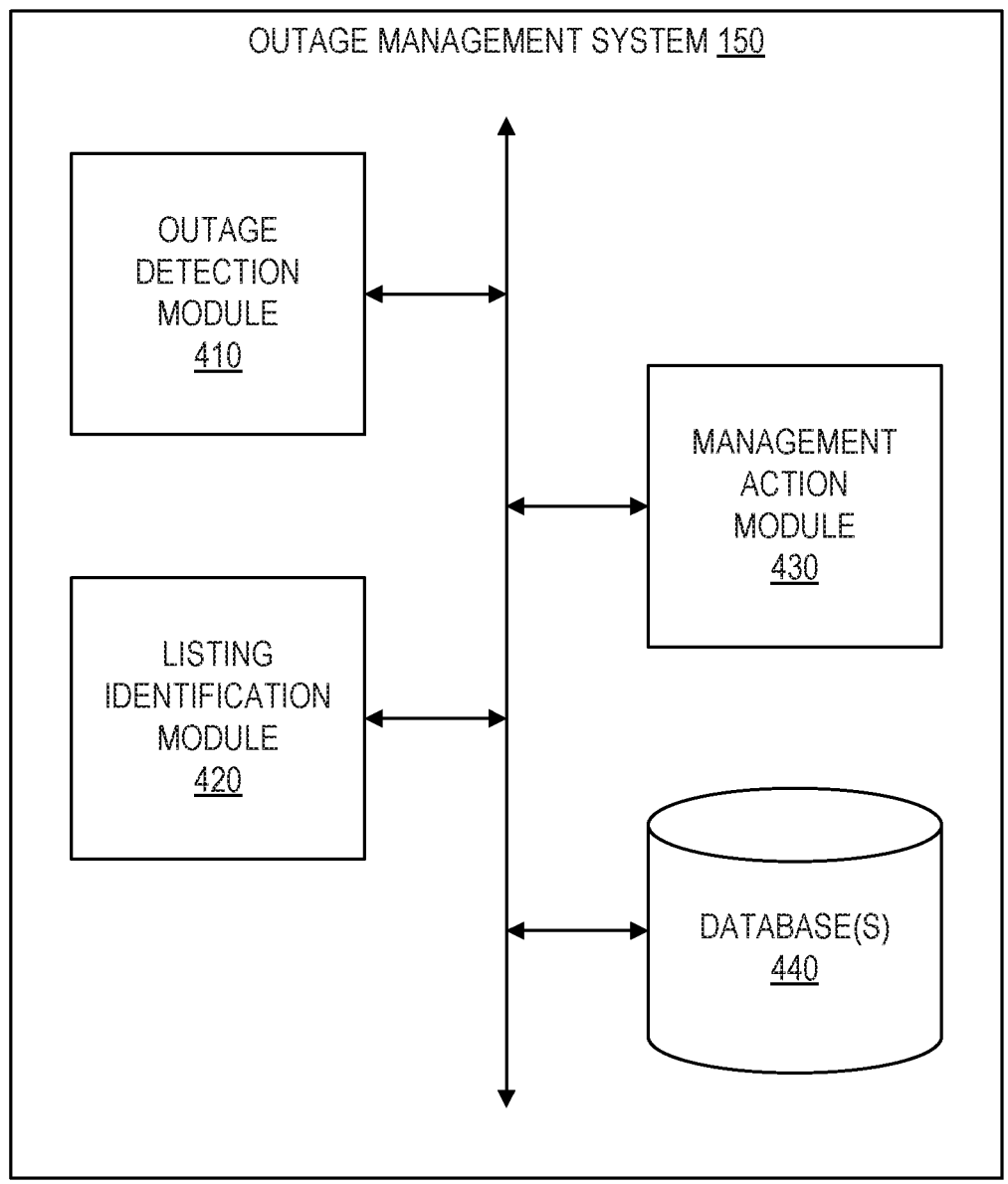
FIG. 4 is a block diagram illustrating components of an outage management system, in accordance with some example embodiments.

FIG. 4 is a block diagram illustrating components of the outage management system 150, in accordance with some example embodiments. In some example embodiments, the outage management system 150 comprises any combination of one or more of an outage detection module 410, a listing identification module 420, and a management action module 430. The outage management system 150 can also comprise one or more databases 440. The outage detection module 410, the listing identification module 420, the management action module 430, and the database(s) 440 can be communicatively coupled to each other, and can reside on a machine having a memory and at least one processor. These components of the outage management system 150 can also reside on separate machines. Database(s) 440 can be incorporated into database(s) 126 of FIG. 1.

In some example embodiments, the outage detection module 410 is configured to detect or receive an indication of a service outage of an online service. The service outage can disable the online service from performing one or more functions for a period of time. In some example embodiments, the service outage disables the online service from receiving a bid for an item listing on the online service or from enabling potential bidders from submitting a bid for the item listing. The item listing can have a corresponding seller and a corresponding listing end time (e.g., the time at which the auction ends and no more bids are accepted).

A service outage can comprise an outage of an entire online entity (e.g., an entire website) providing an online service or a compartmentalized outage affecting only a portion of the online entity providing the online service. Examples of outages include, but are not limited to, a server failure, a network failure, and a software application failure.

In some example embodiments, the outage detection module 410 is configured to perform one or more monitoring operations to test whether end-users can interact with the online service (e.g., website or web application) as expected. Examples of monitoring techniques that can be employed within the scope of the present disclosure include, but are not limited to, synthetic monitoring techniques. Synthetic monitoring comprises monitoring that is performed using a browser emulation or scripted recordings of web transactions, where behavioral scripts (or paths) are used to simulate an action or path that an end-user would take on a website or other online service. Those paths are then continuously monitored at specific intervals for performance (e.g., availability). Other types of monitoring techniques are also within the scope of the present disclosure. It is contemplated that the outage detection module 410 can perform monitoring techniques, such as synthetic monitoring, itself, or can alternatively receive an indication of an outage from an external source that performs such monitoring techniques.

In some example embodiments, the outage detection module 410 is further configured to determine timing information for the service outage. The timing information indicates the time period during which the service outage occurred. Accordingly, the timing information can comprise any combination of one or more of a start time for the service outage (e.g., the time at which the service outage started and the online service became unavailable to end-users), an end time for the service outage (e.g., the time at which the service outage ended and the online service became available to end-users), and the duration of the service outage (e.g., the amount of time between the start time and the end time). Other timing information is also within the scope of the present disclosure. In some example embodiments, the timing information is stored in database(s) 440 for subsequent access, retrieval, and processing.

In some example embodiments, the listing identification module 420 is configured to identify one or more item listings that have been affected by the service outage based on a corresponding end time of the item listing(s) and the timing information for the service outage. Records of the item listings and their corresponding data (e.g., seller, start time, end time, bids) can be stored in database(s) 440 for subsequent access, retrieval, and processing.

Although certain item listings may be alive during the time of the service outage, not all live item listings are affected to a degree that warrants prevention or remediation actions. Item listings that end during the service outage or shortly after the service outage ends (e.g., 5 minutes after the service outage ends) are more likely to be negatively affected than item listings that end before the service outage or well after the service outage ends (e.g., 12 hours after the service outage ends). In some example embodiments, the listing identification module 420 is configured to identify one or more item listings based on a determination that the end time of the service outage satisfies a predetermined proximity threshold with respect to the end time(s) of the item listing(s). The predetermined proximity threshold can be a maximum amount of time between the end time of the service outage that the end time(s) of the item listing(s) must be within in order to satisfy the threshold.

Figure 5:
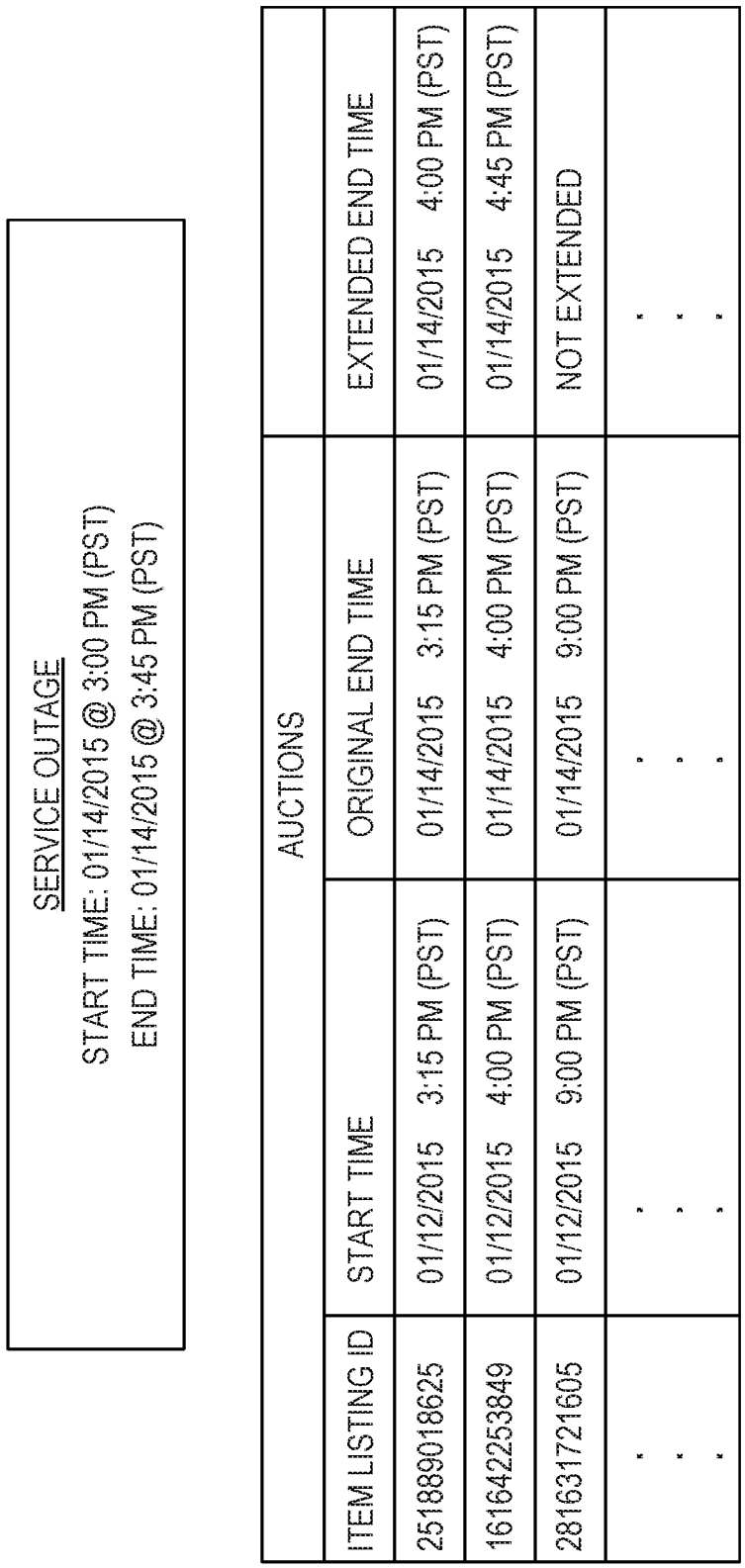
FIG. 5 illustrates a table comprising associations in a database between item listings and their corresponding end times, in accordance with some example embodiments.

One example of identifying item listings based on their corresponding end times and the timing information of the service outage can be explained with respect to FIG. 5. FIG. 5 illustrates a table 500 comprising associations in a database between item listings and their corresponding end times, in accordance with some example embodiments. In one example, a service outage for an online auction starts at 3:00 PM and ends at 3:45 PM. The corresponding end times of the item listings of the auction can be compared with this timing information of the service outage in order to determine which item listings have been sufficiently affected by the service outage. This determination can be made for each item listing based on a determination of whether the original end time for the corresponding item listing is or was within the time period of the service outage or within a predetermined amount of time after the service outage ended. In one example, the listing identification module 420 can use a predetermined proximity threshold of one hour after the end of the service outage. In this example, item listing "251889018625" would be identified as satisfying this predetermined proximity threshold because its end time (3:15 PM) occurred during the service outage, item listing "161642253849" would be identified as satisfying this predetermined proximity w threshold because its end time (4:00 PM) occurred within one hour after the end time (3:45 PM) of the service outage, and item listing "281631721605" would not be identified as satisfying this predetermined proximity threshold because its end time (9:00 PM) occurred more than one hour after the end time (3:45 PM) of the service outage.

Referring back to FIG. 4, in some example embodiments, the management action module 430 is configured to perform one or more outage management actions based on the identification of the item listing(s). The outage management action(s) can be performed in response to the identification of the item listing(s).

In some example embodiments, the outage management action comprises automatically extending the end time(s) of the item listing(s). The management action module 430 can be configured to extend the end time of an item listing based on the timing information for the service outage. For example, the end time of the item listing can be extended by an amount corresponding to the amount of time that the item listing was alive (e.g., before the end time of the item listing) during the service outage.

Referring back to FIG. 5, in this example, the item listing "251889018625" is extended from 3:15 PM (PST) to 4:00 PM (PST) based on the fact that the original end time of that item listing was 15 minutes after the service outage started at 3:00 PM (PST). Since potential bidders missed out on the opportunity to submit bids for the item listing for the last 15 minutes of the item listing due to the service outage, the management action module 430 can extend the end time of the item listing to 15 minutes after the service outage ends, which would be 4:00 PM (PST) in this example, 15 minutes after the service outage end time of 3:45 PM (PST). In some example embodiments, an additional amount of time on top of the amount corresponding to the amount of time that the item listing was alive during the service outage can also be incorporated into the extension of the end time of the item listing in order to take into account the delay in potential bidders being notified or otherwise becoming aware of the service outage being resolved. For example, using the example above, an additional 20 minutes can be added to the 15 minutes in determining the amount of time to extend the item listing "251889018625" in order to provide potential bidders enough time to be notified of the service outage resolution and the extension of the item listing, thereby extending the end time to 4:20 PM (PST) instead of 4:00 PM (PST). Other configurations and methods of extending the end time of a listing are also within the scope of the present disclosure.

In the example in FIG. 5, the item listing "161642253849" is extended from 4:00 PM (PST) to 4:45 PM (PST) based on the fact that 45 minutes of its time alive occurred during the service outage. However, the end time of item listing "281631721605" is not extended because its end time (9:00 PM) is more than one hour after the end time (3:45 PM) of the service outage. Other configurations and predetermined proximity thresholds are also within the scope of the present disclosure.

In some embodiments, the management action module 430 is configured to provide the seller of the item listing with the ability to control whether or not the end time of the item listing will be extended. For example, in some embodiments, the management action module 430 is configured to enable the seller to configure (e.g., select or de-select) an automatic listing extension option during the process of the seller creating the item listing or otherwise before the occurrence of the service outage. Based on a configuration of this automatic listing extension option that indicates the seller's desire to automatically extend the item listing in response to a service outage, the management action module 430 can automatically extend the end time of the item listing. In some embodiments, the management action module 430 is configured to, subsequent to the occurrence of the service outage, prompt the seller to select whether or not to extend the end time of the listing, thus enabling the seller to make the decision of whether to extend an item listing on a case by case basis.

The management action module 430 can be further configured to identify at least one potential bidder for the item listing(s), and to transmit, or otherwise cause to be displayed, an extension notification to the potential bidder(s). The potential bidders can be determined based on behavior or profile information of users of the online service indicating that they have an interest or would likely have an interest in the item listing. Examples of behavior or profile information of a user that can be used as a basis for identifying the user as a potential bidder for an item listing include, but are not limited to, the user having already submitted a bid for the item listing, the user having already submitted a bid for a different item listing for a product or service determined to be sufficiently similar to the product or service of the item listing at issue (e.g., based on a category comparison), the user having already indicated an interest in the item listing (e.g., placing the item on a watch list, "liking" the item, viewing details of the item listing for a predetermined minimum amount of time), and the user having already indicated an interest in a different item listing for a product or service determined to be sufficiently similar to the product or service of the item listing at issue. Other types of information can also be used as the basis for identifying a user as a potential bidder for an item listing.

Figure 6:
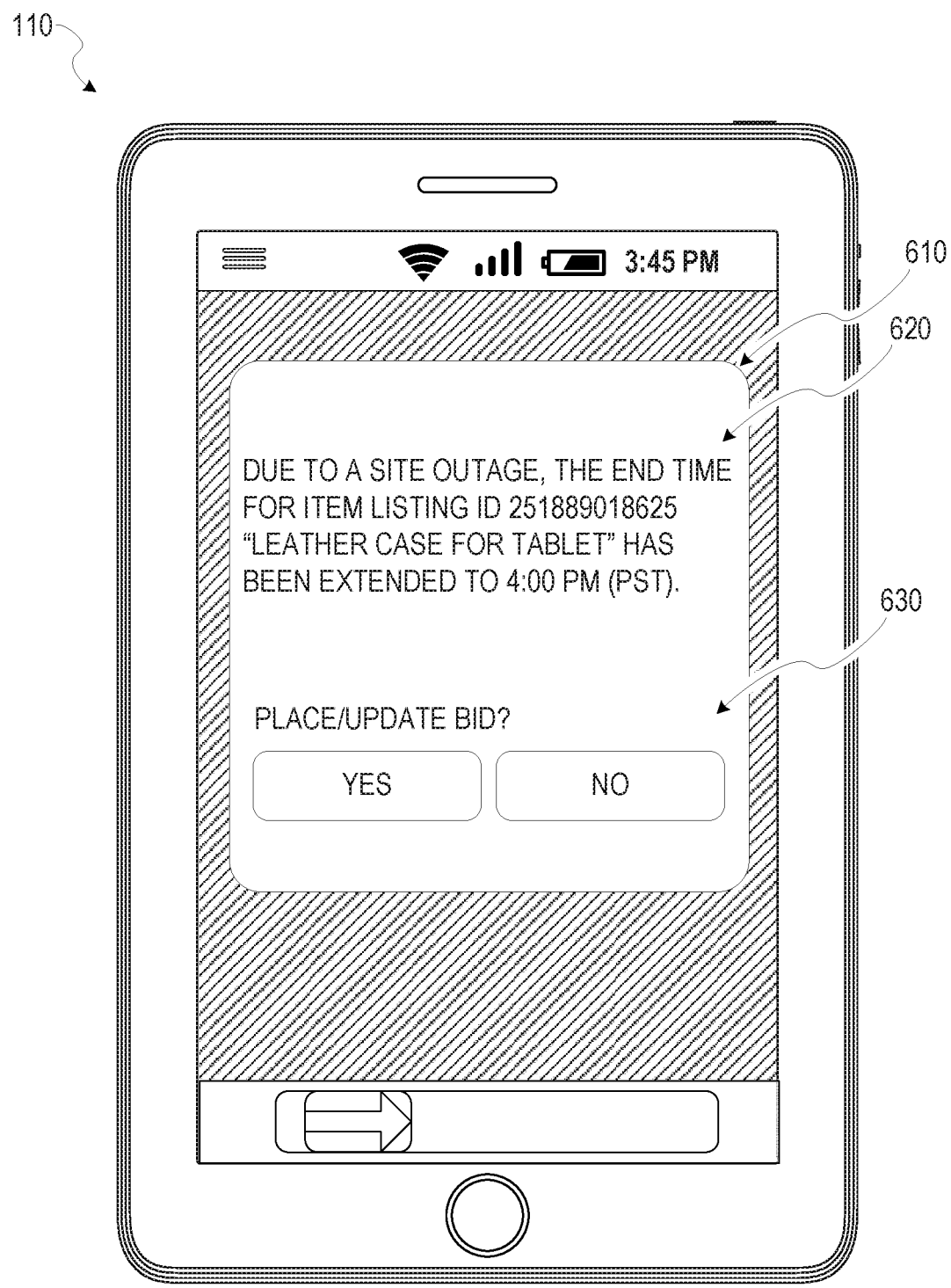
FIG. 6 illustrates an extension notification displayed on a client device, in accordance with some example embodiments.

FIG. 6 illustrates an extension notification 610 being displayed on client device 110, in accordance with some example embodiments. Although FIG. 6 shows client device 110 as a smartphone, it is contemplated that other types of client devices are also within the scope of the present disclosure, as previously discussed. The extension notification 610 comprises an indication 620 that the end time of the item listing has been extended. The extension notification 610 can also comprise a selectable option 630 prompting the user of the client device 110 to take an action. For example, as seen in FIG. 6, the selectable option 630 can prompt the user to place a bid or update a bid for an item listing for which the end time has been extended. The selectable option 630 can be configured to trigger an action on the online service when selected. For example, selection of "YES" in FIG. 6 can trigger the presentation of page on which the user can place or update a bid for the item listing. Other configurations are also within the scope of the present disclosure.

Figure 7:
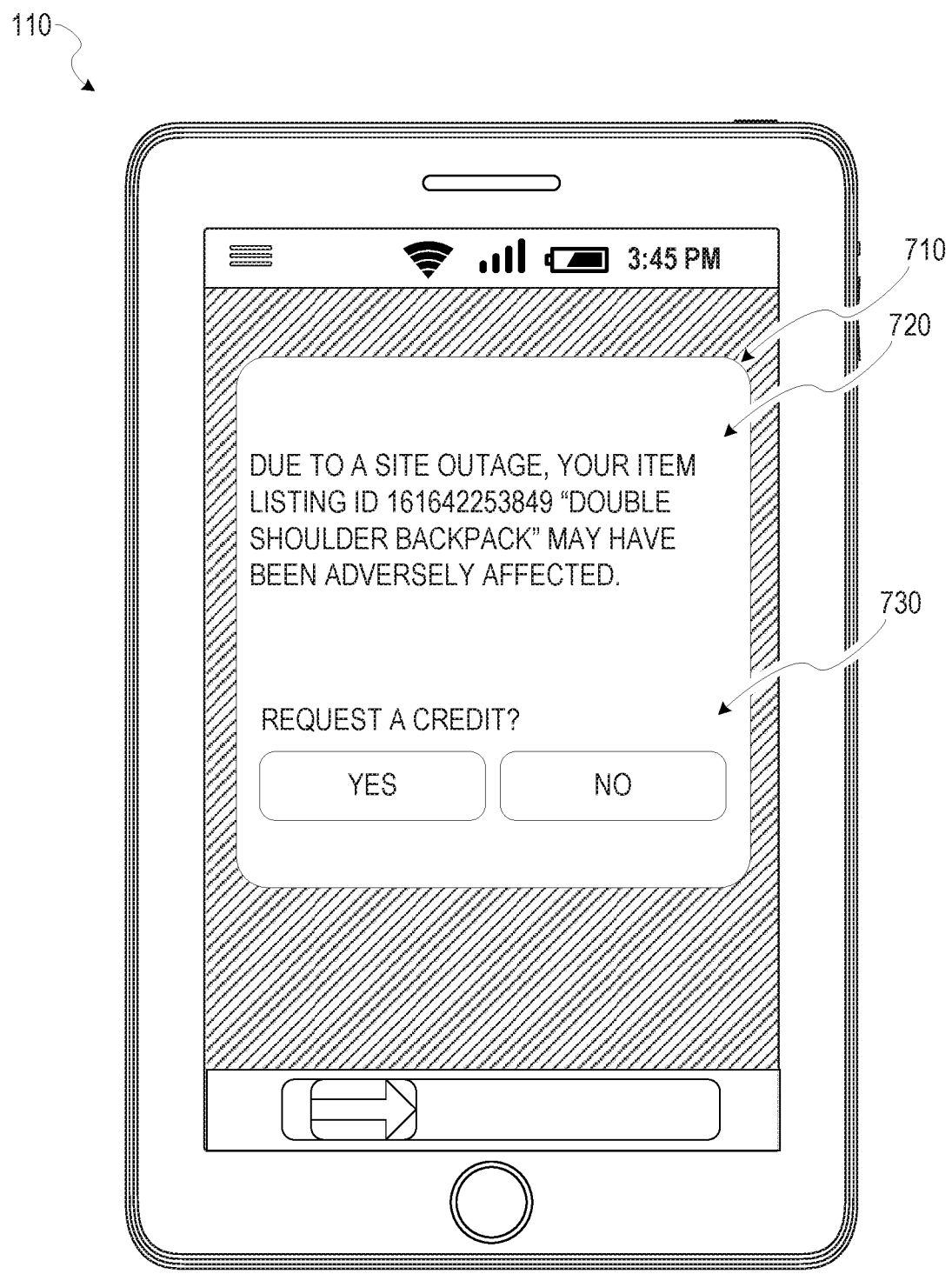
FIG. 7 illustrates an outage notification displayed on a client device, in accordance with some example embodiments.

In some example embodiments, the outage management action comprises automatically generating an outage notification of the service outage and transmitting the notification to the seller(s) of the item listing(s) identified as having been sufficiently impacted by the service outage. FIG. 7 illustrates an outage notification 710 being displayed on the client device 110, in accordance with some example embodiments. The outage notification 710 comprises an indication 720 that an item listing of the seller has been adversely affected due to the service outage.

The outage notification 710 can also comprise a selectable option 730 for the seller to request credit as compensation for lost revenue (e.g., lost higher bids) due to the service outage. The selectable option 730 can be configured to trigger an action on the online service when selected. For example, selection of "YES" in FIG. 7 can trigger the automatic generation and submission of a request for the credit, which can then be processed by the online service. In some example embodiments, the management action module 430 can automatically populate a request with the relevant information, such as a request identification (e.g., a request ID number), an identification of the seller, an identification of the item listing, item listing information (e.g., start time, end time, number of bids, bid prices), and service outage information (e.g., start time, end time). Other configurations are also within the scope of the present disclosure. The management action module 430 can generate and automatically populate the request in response to the user selecting the selectable "YES" option 730, or before such selection in response to the item listing being identified as having been sufficiently affected by the service outage. The request can be stored in database(s) 440.

It is contemplated that the credit can be provided in a variety of forms. For example, in some embodiments, the credit comprises a monetary value that can be transferred outside of the context of the online service where it can be used for other purposes (e.g., monetary funds that can be transferred to an external bank account for use independent of the online service). In some embodiments, the credit comprises credit that is restricted to use only with the online service or one or more other entities (e.g., an electronic gift card). It is contemplated that other types of credit are also within the scope of the present disclosure.

In some example embodiments, the outage management action comprises automatically issuing a credit to the account of the seller. The management action module 430 can be configured to determine an amount of the credit based on one or more factors.

One factor upon which the amount of the credit can be determined is a final value fee of the item listing. A final value fee is a fee that is charged by the online service to the seller of the item listing based on the item of the item listing being sold via the online service. Final value fees can be calculated based on the total amount of the sale of the item. The credit amount can be set to be equal to or include the final value fee.

Another factor upon which the amount of the credit can be determined is an insertion fee of the item listing. An insertion fee is a fee that is charged by the online service to the seller of the item listing based on the seller listing the item for sale on the online service. Insertion fees can be charged to the seller's account at the time of listing, such that the seller's account is charged even if the item does not sell. The credit amount can be set to be equal to or include the insertion fee.

Yet another factor upon which the amount of the credit can be determined is an estimated final highest bid value for the item listing if the service outage had not occurred. In some example embodiments, this estimated final highest bid value is determined based on one or more of the actual final highest bid value for the item listing, final highest bid values for item listings that are determined to be sufficiently similar (e.g., item listings determined to be sufficiently similar based on title, description, category, etc.), the total number of bidders on the item listing, the total number of updated bids on the item listing (e.g., how many times bidders increased their respective bids), the time of day during which the service outage occurred, the day of the week during which the service outage occurred, the month during which the service outage occurred, and seasonal (e.g., holidays) and promotional (e.g., sales events) considerations corresponding to the time of the service outage. Other factors in determining the estimated final highest bid value for the item listing are also within the scope of the present disclosure.

Figure 8:
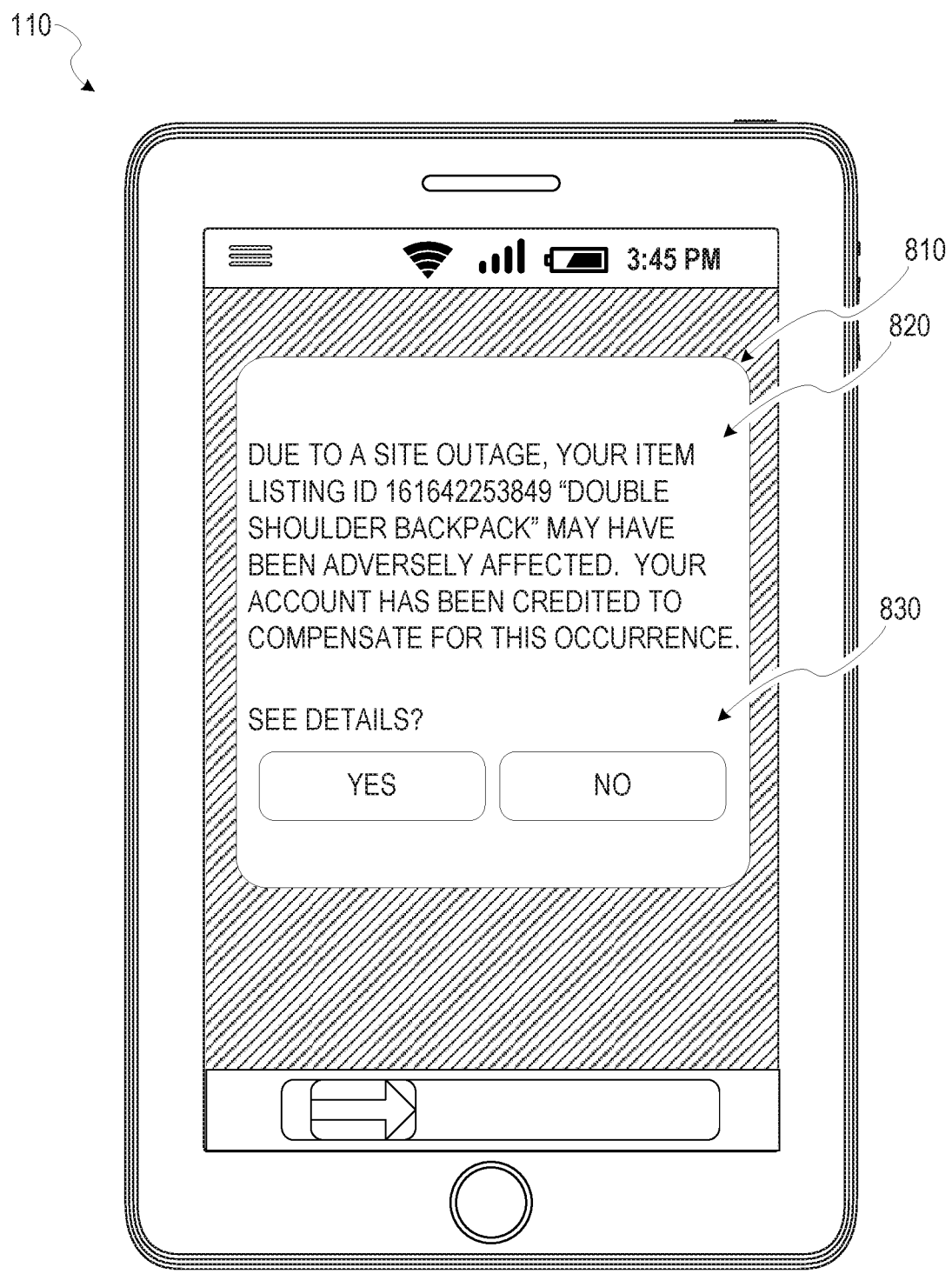
FIG. 8 illustrates a credit notification displayed on a client device, in accordance with some example embodiments.

FIG. 8 illustrates a credit notification 810 displayed on the client device 110, in accordance with some example embodiments. The credit notification 810 comprises an indication 820 that the seller's account has been credited in order to compensate for the service outage.

Figures 9, 10:
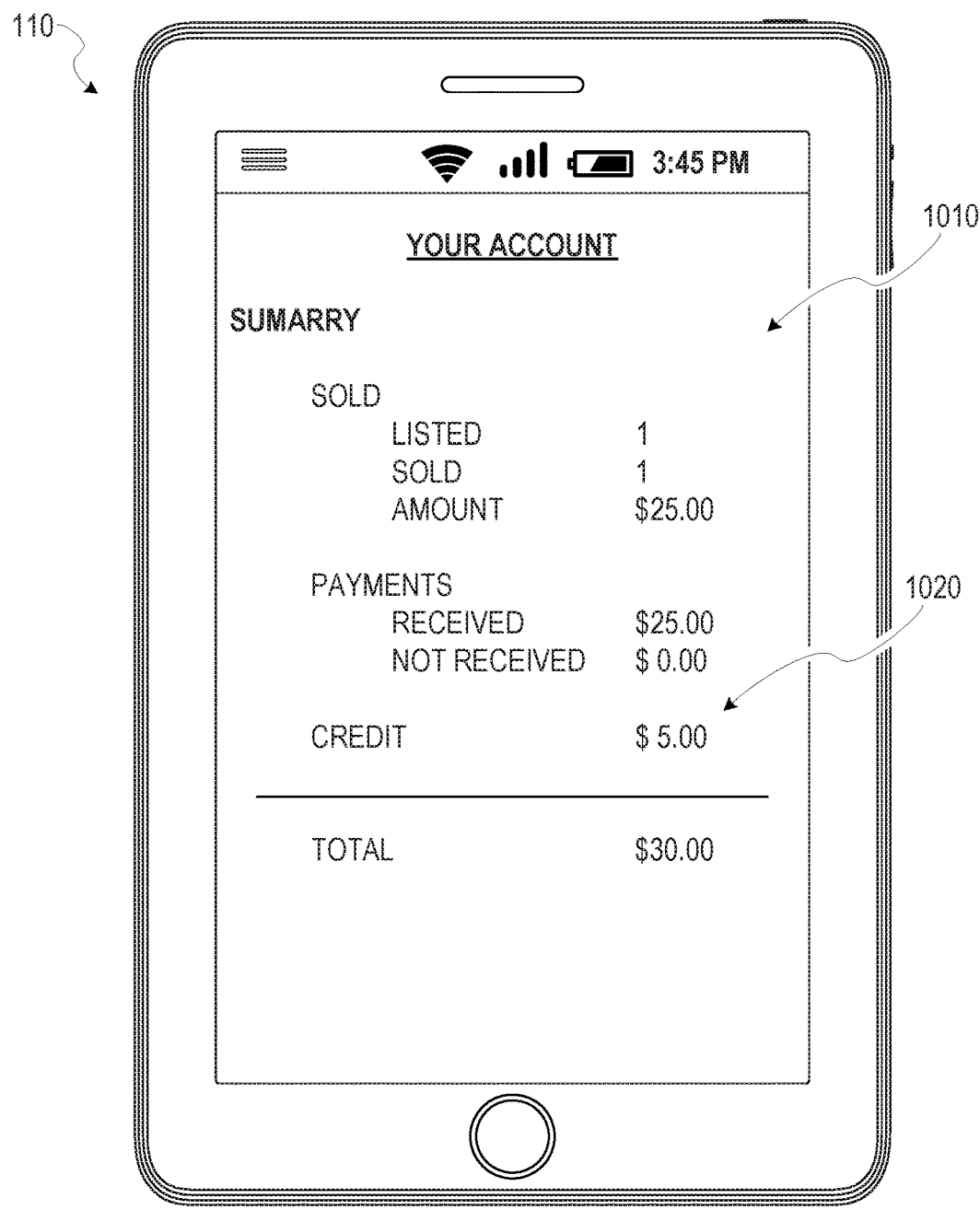
FIG. 9 illustrates a table comprising user account data, in accordance with some example embodiments.
FIG. 10 illustrates user account data displayed on a client device, in accordance with some example embodiments.

FIG. 9 illustrates a table 900 comprising user account data of the seller's account, in accordance with some example embodiments. The account data can include an amount of sales revenue corresponding to items sold by the seller via the online service, an amount that the seller's account has been credited for reasons other than the sale of items (e.g., as compensation for the service outage), and a total amount owed to or owed by the seller (e.g., the amount of sales plus the amount of credit). Other configurations are also within the scope of the present disclosure.

Referring back to FIG. 8, the credit notification 810 can also comprise a selectable option 830 for the seller to view the details of the seller's account having been issued the credit. The selectable option 830 can be configured to trigger an action on the online service when selected. For example, selection of "YES" in FIG. 8 can trigger the automatic generation and display of account data of the seller.

FIG. 10 illustrates user account data 1010 displayed on the client device 110, in accordance with some example embodiments. The account data can include a summary of items sold by the seller and payments received (as well as not received) by the seller for the sold items. In some example embodiments, the account data 1010 comprises an indication 1020 of the amount the seller's account has been credited, including any amounts credited based on service outages. Other configurations are also within the scope of the present disclosure.

It is contemplated that outage management actions other than those discussed above are also within the scope of the present disclosure.

Figure 11:
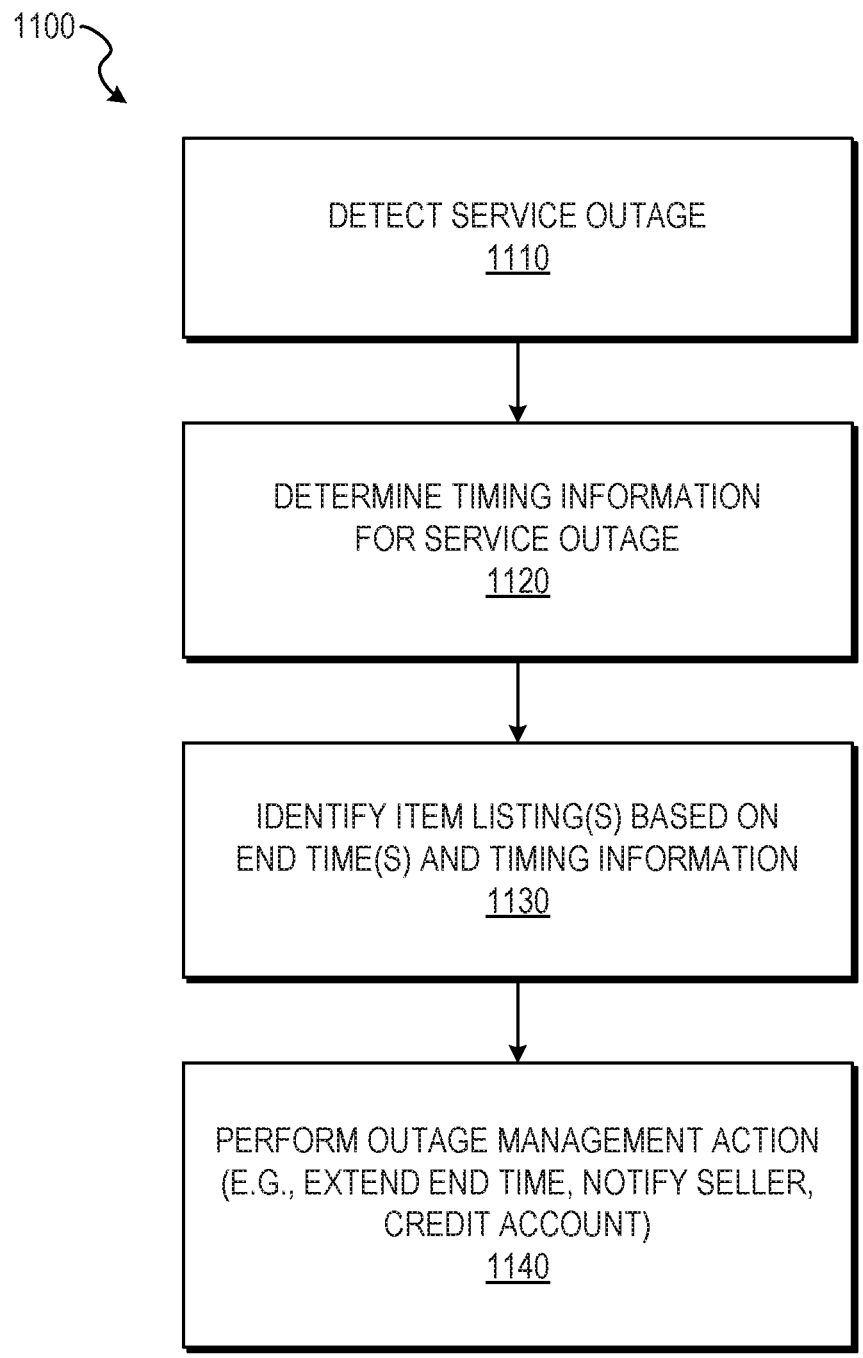
FIG. 11 is a flowchart illustrating a method of managing an outage, in accordance with some example embodiments.

FIG. 11 is a flowchart illustrating a method 1100 of managing an outage, in accordance with some example embodiments. The operations of method 1100 can be performed by a system or modules of a system. The operations of method 1100 can be performed by processing logic that can comprise hardware (e.g., circuitry, dedicated logic, programmable logic, microcode, etc.), software (e.g., instructions run on a processing device), or a combination thereof. In one example embodiment, the method 1100 is performed by the outage management system 150 of FIGS. 1 and 4, or any combination of one or more of its components or modules, as described above.

At operation 1110, a service outage of an online service is detected, or an indication of the service outage is otherwise received. As previously discussed, the service outage can be detected by the outage management system 150 either with or without the assistance of an external outage monitoring service. In some example embodiments, the service outage disables the online service from receiving a bid for an item listing on the online service. The item listing has a seller and a listing end time.

At operation 1120, timing information for the service outage is determined. In some example embodiments, the timing information of the service outage comprises an outage end time.

At operation 1130, the item listing is identified based on the listing end time and the timing information for the service outage. In some example embodiments, the item listing is identified based on the outage end time satisfying a predetermined proximity threshold with respect to the listing end time.

At operation 1140, an outage management action is performed based on the identification of the item listing. In some example embodiments, the outage management action comprises one of automatically extending the listing end time, automatically transmitting an outage notification of the service outage to the seller, and automatically issuing a credit to an account of the seller.

It is contemplated that the operations of method 1100 can incorporate any of the other features disclosed herein.

Figure 12:
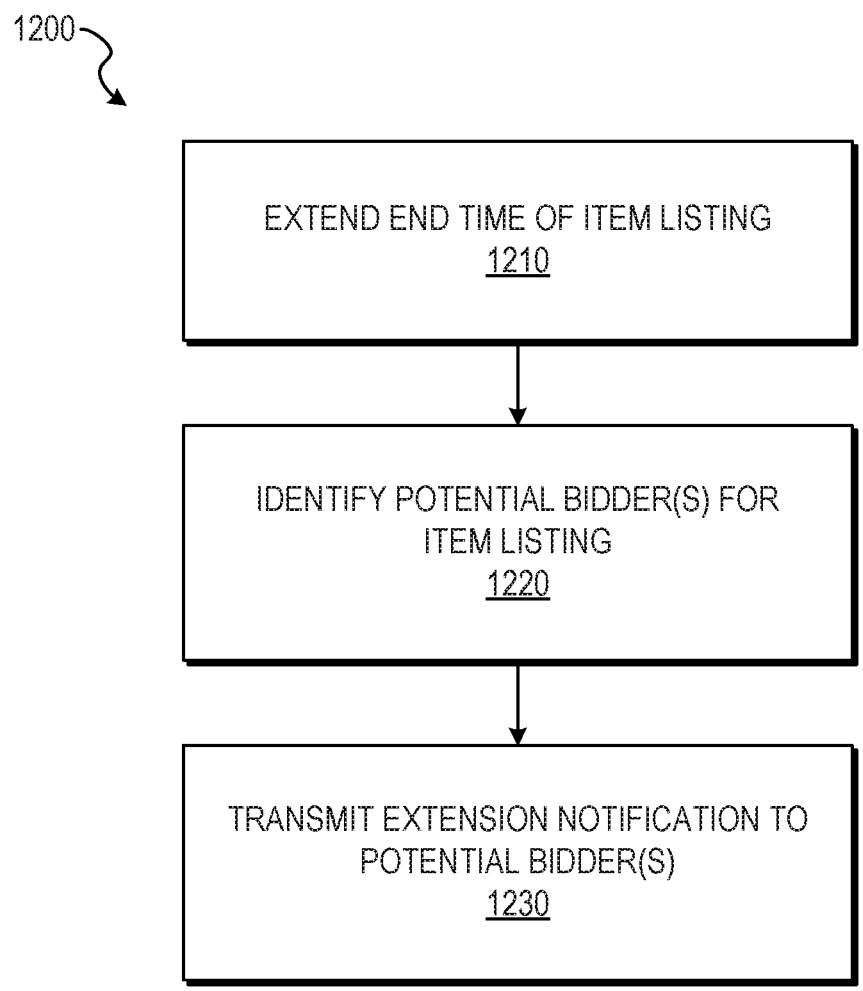
FIG. 12 is a flowchart illustrating a method of extending an end time for an item listing, in accordance with some example embodiments.

FIG. 12 is a flowchart illustrating a method 1200 of extending an end time for an item listing, in accordance with some example embodiments. The operations of method 1200 can be performed by a system or modules of a system. The operations of method 1200 can be performed by processing logic that can comprise hardware (e.g., circuitry, dedicated logic, programmable logic, microcode, etc.), software (e.g., instructions run on a processing device), or a combination thereof. In one example embodiment, the method 1200 is performed by the outage management system 150 of FIGS. 1 and 4, or any combination of one or more of its components or modules, as described above.

At operation 1210, the end time of an identified item listing (e.g., the item listing identified at operation 1130 in FIG. 11) is automatically extended. In some example embodiments, the end time is extended based on the timing information for the service outage. The timing information can comprise an amount of time the online service was disabled.

At operation 1220, at least one potential bidder for the item listing is identified. As previously discussed, the potential bidder(s) can be determined based on behavior or profile information of users of the online service indicating that they have an interest or would likely have an interest in the item listing.

At operation 1230, an extension notification is transmitted, or otherwise caused to be displayed, to the potential bidder(s). In some example embodiments, the extension notification comprises an indication that the end time of the item listing has been extended.

It is contemplated that the operations of method 1200 can incorporate any of the other features disclosed herein.

Figure 13:
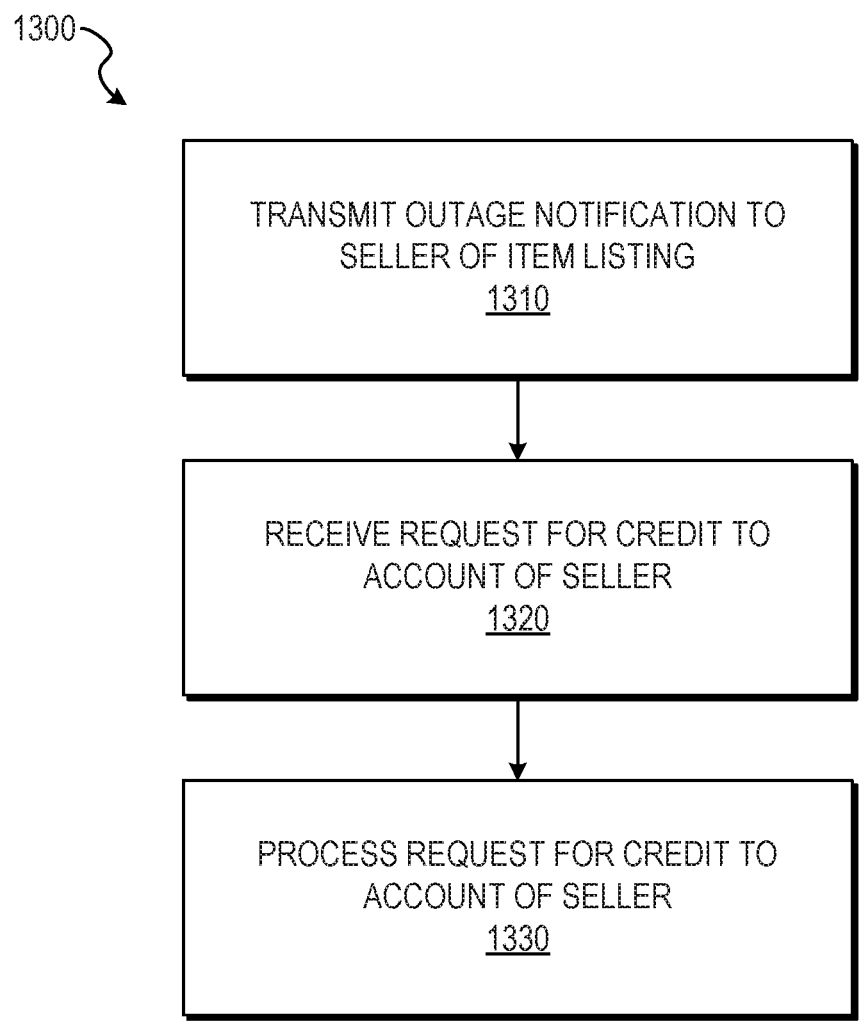
FIG. 13 is a flowchart illustrating a method of providing a notification of an outage to a seller of an item listing, in accordance with some example embodiments.

FIG. 13 is a flowchart illustrating a method 1300 of providing a notification of an outage to a seller of an item listing, in accordance with some example embodiments. The operations of method 1300 can be performed by a system or modules of a system. The operations of method 1300 can be performed by processing logic that can comprise hardware (e.g., circuitry, dedicated logic, programmable logic, microcode, etc.), software (e.g., instructions run on a processing device), or a combination thereof. In one example embodiment, the method 1300 is performed by the outage management system 150 of FIGS. 1 and 4, or any combination of one or more of its components or modules, as described above.

At operation 1310, an outage notification of a service outage is automatically generated and transmitted to the seller of an identified item listing (e.g., the item listing identified at operation 1130 in FIG. 11). In some example embodiments, the outage notification comprises an indication of a selectable option for the seller to request credit.

At operation 1320, a request for credit to the account of the seller is received, such as based on the seller selecting the option to request credit.

At operation 1330, the request for credit to the account of the seller is processed. Such processing can include, but is not limited to, verifying that the request is valid, such as that the seller is entitled to a credit based on the details of the item listing (e.g., start time, end time) and the details of the service outage (e.g., start time, end time), as well as applying the credit to the seller's account based on the request being verified as valid.

It is contemplated that the operations of method 1300 can incorporate any of the other features disclosed herein.

Figure 14:
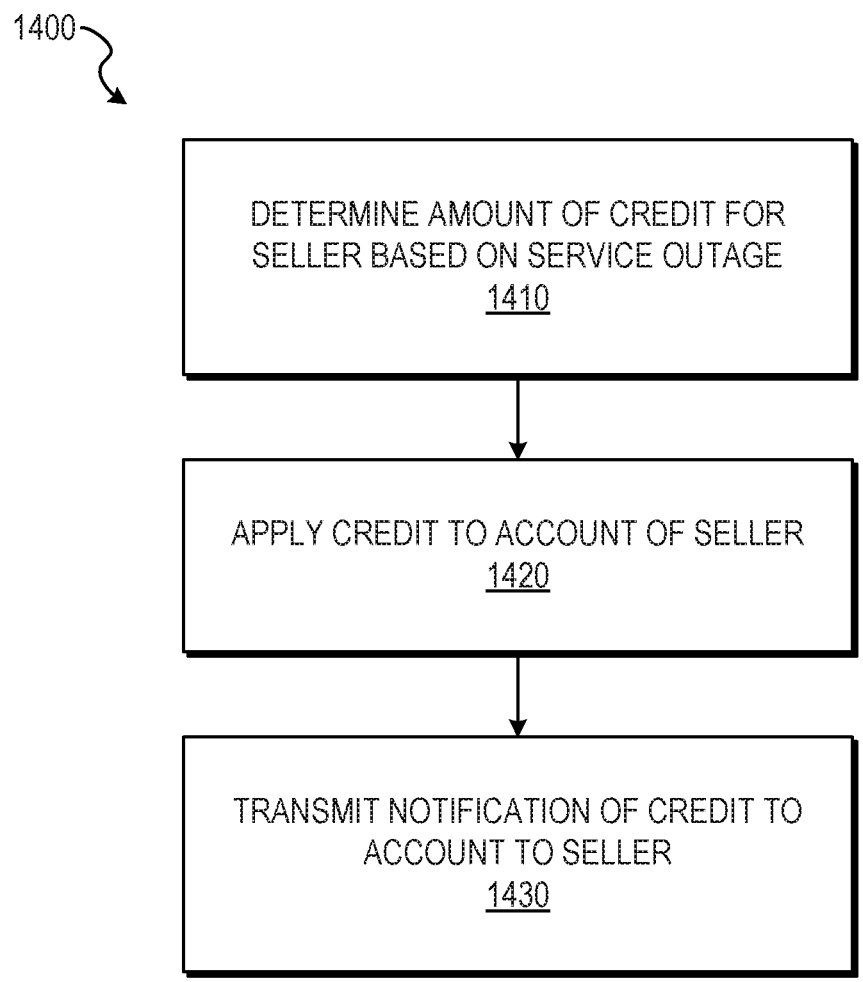
FIG. 14 is a flowchart illustrating a method of issuing a credit to an account of a seller, in accordance with some example embodiments.

FIG. 14 is a flowchart illustrating a method 1400 of issuing a credit to an account of a seller, in accordance with some example embodiments. The operations of method 1400 can be performed by a system or modules of a system. The operations of method 1400 can be performed by processing logic that can comprise hardware (e.g., circuitry, dedicated logic, programmable logic, microcode, etc.), software (e.g., instructions run on a processing device), or a combination thereof. In one example embodiment, the method 1400 is performed by the outage management system 150 of FIGS. 1 and 4, or any combination of one or more of its components or modules, as described above.

At operation 1410, an amount of the credit to issue to the seller's account based on the service outage is determined. In some example embodiments, the determination of the amount of the credit to issue to the seller's account is determined based on at least one of a final value fee of the item listing, an insertion fee of the item listing, and an estimated final bid value if the service outage had not occurred.

At operation 1420, the determined amount of credit is applied to the account of the seller.

At operation 1430, a notification of the credit to the seller's account is transmitted, or otherwise caused to be displayed, to the seller.

It is contemplated that the operations of method 1400 can incorporate any of the other features disclosed herein.

Although reference is made herein to bids and bidders, it is contemplated that the outage management features disclosed herein can also be applied to embodiments that involve situations that do not involve auctions or items that are bid on. For example, in some embodiments, the outage management features disclosed herein are applied to fixed-price item listings and potential buyers, as opposed to auction item listings and potential bidders. In such embodiments, a fixed price item listing can have a corresponding end time (e.g., the time at which the item listing ends and purchase requests are prevented from being processed, such as from the item listing being removed from presentation to potential buyers). Here, the listing identification module 420 can identify the fixed-price item listing based on the end time of the fixed-price item listing and the timing information of a service outage, similar to the listing identification module 420 identifying the auction item listing based on the end time of the auction item listing and the timing information of a service outage. The management action module 430 can perform an outage management action based on the identifying of the fixed-price item listing. The outage management action can comprise one of automatically extending the end time of the fixed-price item listing, automatically transmitting an outage notification of the service outage to the seller of the fixed-price item listing, and automatically issuing a credit to an account of the seller of the fixed-price item listing. The same outage management actions disclosed herein with respect to auction item listings can also be applied to embodiments involving fixed-price item listings.

It is contemplated that any features of any embodiments disclosed herein can be combined with any other features of any other embodiments disclosed herein. Accordingly, these any such hybrid embodiments are within the scope of the present disclosure.

Figure 15:
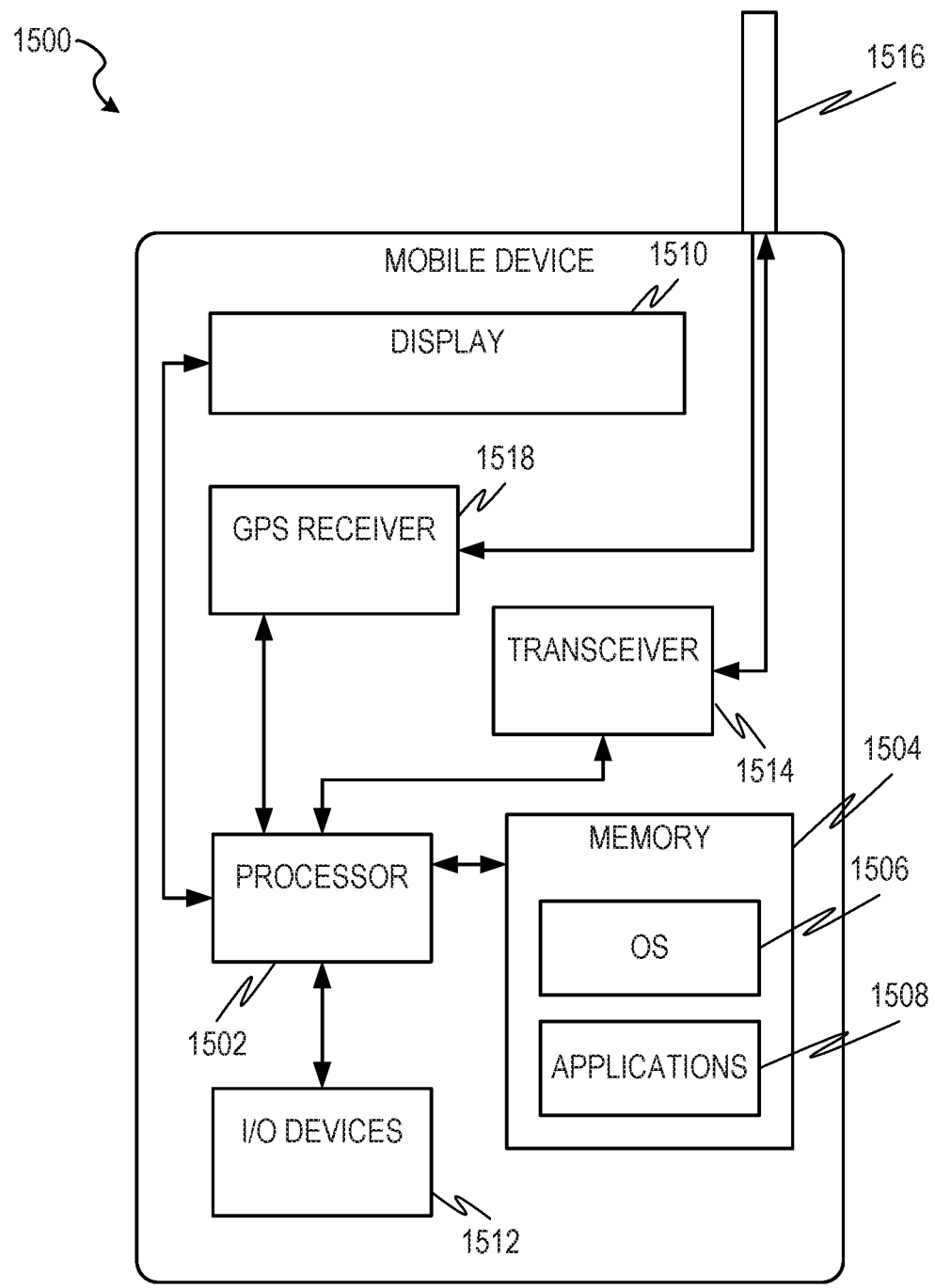
FIG. 15 is a block diagram illustrating a mobile device, in accordance with some example embodiments.

FIG. 15 is a block diagram illustrating a mobile device 1500, in accordance with some example embodiments. The mobile device 1500 can include a processor 1502. The processor 1502 can be any of a variety of different types of commercially available processors suitable for mobile devices 1500 (for example, an XScale architecture microprocessor, a Microprocessor without Interlocked Pipeline Stages (MIPS) architecture processor, or another type of processor). A memory 1504, such as a random access memory (RAM), a Flash memory, or other type of memory, is typically accessible to the processor 1502. The memory 1504 can be adapted to store an operating system (OS) 1506, as well as application programs 1508, such as a mobile location enabled application that can provide LBSs to a user. The processor 1502 can be coupled, either directly or via appropriate intermediary hardware, to a display 1510 and to one or more input/output (I/O) devices 1512, such as a keypad, a touch panel sensor, a microphone, and the like. Similarly, in some example embodiments, the processor 1502 can be coupled to a transceiver 1514 that interfaces with an antenna 1516. The transceiver 1514 can be configured to both transmit and receive cellular network signals, wireless data signals, or other types of signals via the antenna 1516, depending on the nature of the mobile device 1500. Further, in some configurations, a GPS receiver 1518 can also make use of the antenna 1516 to receive GPS signals.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-14 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the features of the present disclosure in different contexts from the disclosure contained herein.

Figure 16:
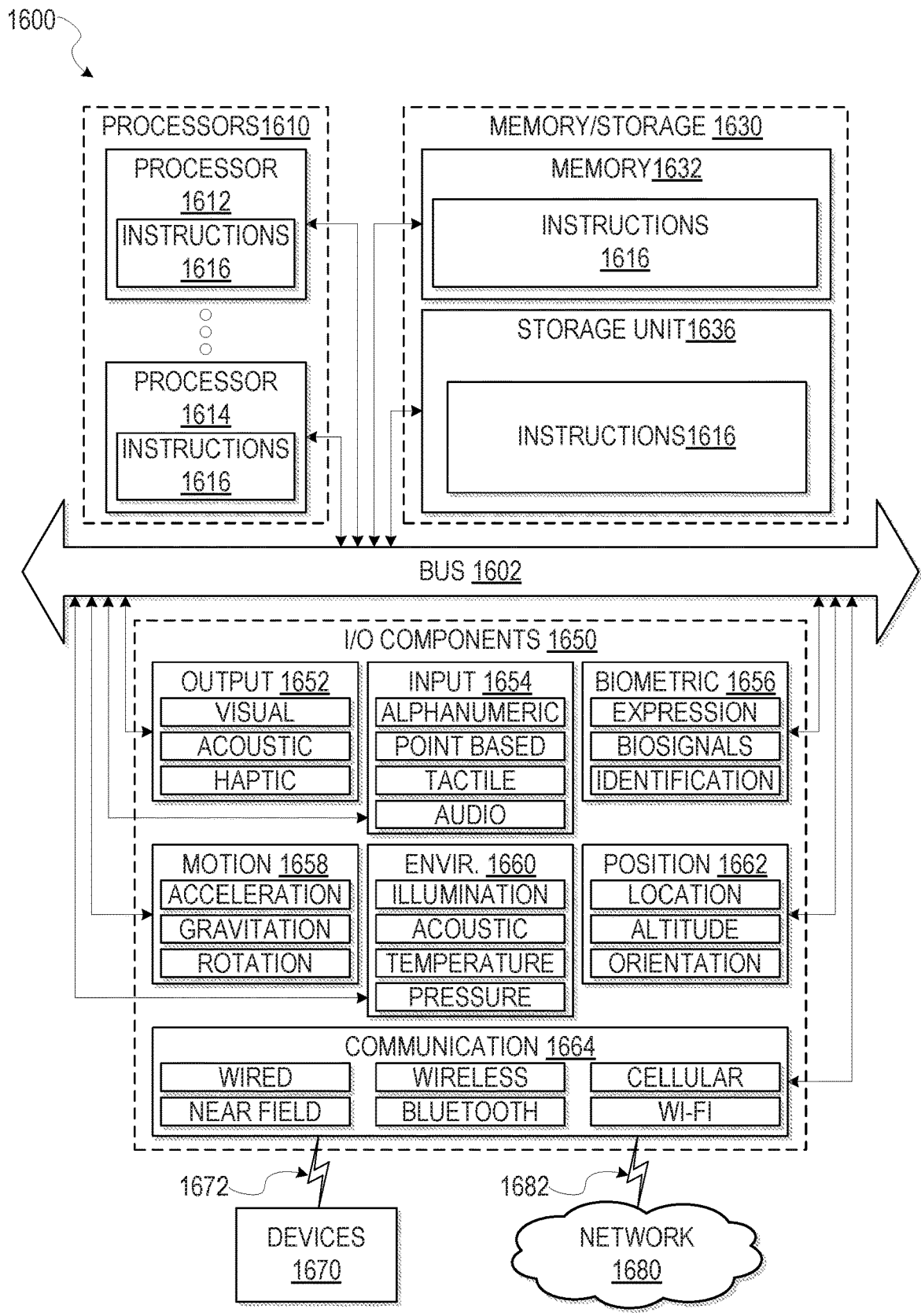
FIG. 16 is a diagrammatic representation of a machine in the form of a computer system within which a set of instructions may be executed for causing the machine to perform any one or more of the methodologies discussed herein, according to an example embodiment.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example the instructions may cause the machine to execute the flow diagrams of FIGS. 11-14. Additionally, or alternatively, the instructions may implement the outage detection module 410, the listing identification module 420, and the management action module 430 of FIG. 4, and so forth. The instructions transform the general, non-programmed machine into a particular machine programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory 1630, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1612 and processor 1614 that may execute instructions 1616. The term "processor" is intended to include multi-core processor that may comprise two or more independent processors (sometimes referred to as "cores") that may execute instructions contemporaneously. Although FIG. 16 shows multiple processors, the machine 1600 may include a single processor with a single core, a single processor with multiple cores (e.g., a multi-core process), multiple processors with a single core, multiple processors with multiples cores, or any combination thereof.

The memory/storage 1630 may include a memory 1632, such as a main memory, or other memory storage, and a storage unit 1636, both accessible to the processors 1610 such as via the bus 1602. The storage unit 1636 and memory 21@32 store the instructions 1616 embodying any one or more of the methodologies or functions described herein. The instructions 1616 may also reside, completely or partially, within the memory 1632, within the storage unit 21@36, within at least one of the processors 1610 (e.g., within the processor's cache memory), or any suitable combination thereof, during execution thereof by the machine 1600. Accordingly, the memory 1632, the storage unit 21@36, and the memory of processors 1610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via coupling 1682 and coupling 1672 respectively. For example, the communication components 1664 may include a network interface component or other suitable device to interface with the network 1680. In further examples, communication components 1664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a Universal Serial Bus (USB)).

Moreover, the communication components 1664 may detect identifiers or include components operable to detect identifiers. For example, the communication components 1664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1664, such as, location via Internet Protocol (IP) geo-location, location via Wi-Fi® signal triangulation, location via detecting a NFC beacon signal that may indicate a particular location, and so forth.

In various example embodiments, one or more portions of the network 1680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or other type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., hypertext transfer protocol (HTTP)). Similarly, the instructions 1616 may be transmitted or received using a transmission medium via the coupling 1672 (e.g., a peer-to-peer coupling) to devices 1670. The term "transmission medium" shall be taken to include any intangible medium that is capable of storing, encoding, or carrying instructions 1616 for execution by the machine 1600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   one or more processors; and
   one or more non-transitory machine-readable storage media storing a set of instructions that, in response to being executed by the one or more processors, cause the system to perform operations comprising:
      detecting a service outage of an online service, wherein the service outage disables the online service from being able to receive bids with respect to an item listing on the online service, wherein the item listing has a listing end time;
      identifying the item listing as having been potentially affected by the service outage based on the listing end time and an end time of the service outage;
      in response to identifying the item listing as having been potentially affected by the service outage, identifying a user of the online service as a potential bidder with respect to the item listing based on behavior information included in a behavior profile of the user, wherein the behavior information indicates interest by the user in the item listing; and
      performing an outage management action based on (a) identifying the item listing as having been potentially affected by the service outage and (b) identifying the user as a potential bidder of the item, wherein the outage management action includes automatically extending the listing end time of the item listing and automatically transmitting an extension notification of the listing end time to the user.

2. The system of claim 1, wherein the operations further comprise:
   determining timing information for the service outage that indicates an outage time period during which the service outage occurred, wherein the item listing is identified as having been potentially affected by the service outage based on a relationship between the outage time period and the listing end time.

3. The system of claim 1, wherein the item listing is identified as having been potentially affected by the service outage based on the end time of the service outage satisfying a proximity threshold with respect to the listing end time.

4. The system of claim 1, wherein the operations further comprise extending the listing end time based on a duration of the service outage.

5. The system of claim 1, wherein the outage management action further includes automatically transmitting an outage notification of the service outage to a seller of the item.

6. The system of claim 1,
   wherein the operations further comprise monitoring the online service using synthetic monitoring, and wherein the service outage is detected based on the synthetic monitoring, the synthetic monitoring including one or more techniques selected from a group of techniques consisting of: browser emulation and scripted recordings of web transactions.

7. The system of claim 1, wherein the operations further comprise:
identifying, from the behavior information, one or more potential-bidder actions related to the item listing that are selected from a group of potential-bidder actions consisting of: the user having already submitted a bid with respect to the item listing; the user having already submitted a bid with respect to a different item listing for another item similar to the item of the item listing; the user having already indicated an interest in the item listing; and the user having already indicated interest in a different item listing for another item similar to the item of the item listing; and
identifying the user as a potential bidder with respect to the item listing based on the one or more potential-bidder actions.

8. One or more non-transitory machine-readable storage media storing a set of instructions that, in response to being executed by one or more processors, cause a system to perform operations comprising:
monitoring an online service using synthetic monitoring;
detecting a service outage of the online service from the synthetic monitoring of the online service, wherein the service outage disables the online service from being able to receive bids with respect to an item listing on the online service, wherein the item listing has a listing end time;
identifying the item listing as having been potentially affected by the service outage based on the listing end time and an end time of the service outage;
in response to identifying the item listing as having been potentially affected by the service outage, identifying a user of the online service as a potential bidder with respect to the item listing; and
performing an outage management action based on (a) identifying the item listing as having been potentially affected by the service outage and (b) identifying the user as a potential bidder of the item, wherein the outage management action includes automatically extending the listing end time of the item listing and automatically transmitting an extension notification of the listing end time to the user.

9. The one or more non-transitory machine-readable storage media of claim 8, wherein the operations further comprise:
determining timing information for the service outage that indicates an outage time period during which the service outage occurred, wherein the item listing is identified as having been potentially affected by the service outage based on a relationship between the outage time period and the listing end time.

10. The one or more non-transitory machine-readable storage media of claim 8, wherein the item listing is identified as having been potentially affected by the service outage based on the end time of the service outage satisfying a proximity threshold with respect to the listing end time.

11. The one or more non-transitory machine-readable storage media of claim 8, wherein the operations further comprise extending the listing end time based on a duration of the service outage.

12. The one or more non-transitory machine-readable storage media of claim 8, wherein the outage management action further includes automatically transmitting an outage notification of the service outage to a seller of the item.

13. The one or more non-transitory machine-readable storage media of claim 8, wherein the synthetic monitoring includes one or more techniques selected from a group of techniques consisting of: browser emulation and scripted recordings of web transactions.

14. The one or more non-transitory machine-readable storage media of claim 8, wherein the operations further comprise:
identifying, from behavior information of the user included in a behavior profile of the user, one or more potential-bidder actions related to the item listing that are selected from a group of potential-bidder actions consisting of: the user having already submitted a bid with respect to the item listing; the user having already submitted a bid with respect to a different item listing for another item similar to the item of the item listing; the user having already indicated an interest in the item listing; and the user having already indicated interest in a different item listing for another item similar to the item of the item listing; and
identifying the user as a potential bidder with respect to the item listing based on the one or more potential-bidder actions.

15. A method comprising:
detecting, by a computer processor, a service outage of an online service, wherein the service outage disables the online service from being able to receive bids with respect to an item listing on the online service, wherein the item listing has a listing end time;
identifying, by the computer processor, the item listing as having been potentially affected by the service outage based on the listing end time and an end time of the service outage;
in response to identifying the item listing as having been potentially affected by the service outage, identifying, by the computer processor, a user of the online service as a potential bidder with respect to the item listing; and
performing, by the computer processor, an outage management action based on (a) identifying the item listing as having been potentially affected by the service outage and (b) identifying the user as a potential bidder of the item, wherein the outage management action includes automatically extending the listing end time of the item listing and automatically transmitting an extension notification of the listing end time to the user.

16. The method of claim 15, further comprising:
determining, by the computer processor, timing information for the service outage that indicates an outage time period during which the service outage occurred, wherein the item listing is identified as having been potentially affected by the service outage based on a relationship between the outage time period and the listing end time.

17. The method of claim 15, wherein the item listing is identified as having been potentially affected by the service outage based on the end time of the service outage satisfying a proximity threshold with respect to the listing end time.

18. The method of claim 15, wherein the outage management action further includes automatically transmitting an outage notification of the service outage to a seller of the item.

19. The method of claim 15, further comprising:
monitoring, by the computer processor, the online service using synthetic monitoring and wherein the service outage is detected based on the synthetic monitoring, the synthetic monitoring including browser emulation and scripted recordings of web transactions.

20. The method of claim 15, further comprising:
identifying, by the computer processor, from behavior information of the user included in a behavior profile of the user, one or more potential-bidder actions related to the item listing that are selected from a group of potential-bidder actions consisting of:
the user having already submitted a bid with respect to the item listing;
the user having already submitted a bid with respect to a different item listing for another item similar to the item of the item listing;
the user having already indicated an interest in the item listing; and
the user having already indicated interest in a different item listing for another item similar to the item of the item listing; and identifying the user as a potential bidder with respect to the item listing based on the one or more potential-bidder actions.

* * * * *